Sept. 15, 1970  B. D. BEDFORD  3,529,224
SPEED CONTROL OF INDUCTION MOTORS WITH
SEMICONDUCTORS AND RESISTORS
Filed Feb. 28, 1968  3 Sheets-Sheet 1

Inventor:
Burnice D. Bedford,
by Donald R. Campbell
His Attorney.

Sept. 15, 1970  B. D. BEDFORD  3,529,224
SPEED CONTROL OF INDUCTION MOTORS WITH
SEMICONDUCTORS AND RESISTORS Filed Feb. 28, 1968  3 Sheets-Sheet 2

Inventor:
Burnice D. Bedford,
by Ronald R. Campbell
His Attorney.

Inventor:
Burnice D. Bedford,
by Donald R. Campbell
His Attorney.

United States Patent Office 3,529,224
Patented Sept. 15, 1970

3,529,224
SPEED CONTROL OF INDUCTION MOTORS WITH SEMICONDUCTORS AND RESISTORS
Burnice D. Bedford, Scotia, N.Y., assignor to General Electric Company, a corporation of New York
Filed Feb. 28, 1968, Ser. No. 709,027
Int. Cl. H02p 7/62
U.S. Cl. 318—237                                    8 Claims

ABSTRACT OF THE DISCLOSURE

A wound rotor polyphase induction motor has a delta-connected speed control circuit connected to the rotor windings comprising in each phase a resistor in series with a triac or diac which is phase controlled to conduct in one or both directions to change the effective resistance of the rotor circuit. For a greater range of resistance with good wave shape and power factor, another resistor, diode, inductor, or contactors are placed in circuit with the first resistor. In other circuits the resistance in the output of a phase controlled full wave bridge rectifier employing silicon controlled rectifiers is varied to achieve starting or running speed control, and by adding a commutation circuit for the thyristor the turn-off is also selected to control the power factor. A cascade induction motor with intercoupled rotors has connected to the second stator windings a phase controlled bridge rectifier of the foregoing type, or a diode bridge rectifier and a time ratio control circuit for varying the effective resistance.

This invention relates to speed control of induction motors by the use of semiconductor devices and resistors in circuit relationship with the motor windings. More particularly, the invention relates to controlling the speed of polyphase induction motors by changing the effective rotor (or stator) resistance over a wide resistance range by the inclusion of resistors and semiconductors such as thyristors and diodes in a motor speed control circuit.

The speed of wound rotor or phase wound rotor induction motors for running or for starting purposes can be controlled by varying the effective resistance of the rotor circuit. In the wound rotor motor, as opposed to the more common squirrel cage motor, the rotor windings are ordinarily connected as three-phase windings or in general as polyphase windings, and the windings are individually connected through slip rings and brushes to externally mounted switches and resistors for changing the rotor circuit resistance. In such an induction motor, the motor runs at a high speed when the rotor circuit resistance is relatively low, and a high rotor circuit resistance is employed to achieve lower running speeds or good starting torque. This method of speed control has limited use due to the difficulty of obtaining the desired many values of resistance or smoothly varying values of resistance. Thyristors such as the silicon controlled rectifier, the triac, and the diac are now available with sufficient power rating for motor control circuits, and as will be shown can be combined with resistors to control the speed in many motor applications. These motor control circuits are employed in circuit with the rotor windings of the wound rotor induction motor, and it will be demonstrated that they can also be employed in circuit with one stator winding of a cascade modified squirrel cage type induction motor to change the effective resistance of a stator winding circuit to achieve speed control of the motor.

Accordingly, an object of the invention is to provide new and improved semiconductor speed control circuits for polyphase induction motors which obtain a wide range of resistance for controlling the effective resistance of one of the motor winding circuits.

Another object is the provision of new and improved adjustable speed polyphase induction motors having control circuits comprising semiconductors and resistors which are connected to one of the motor windings for changing the effective resistance of the motor winding circuit at reasonable cost over a useful range of resistances with good wave shape and without producing excessive harmonics.

Yet another object of the invention is to provide a variety of semiconductor circuits employing thyristors, diodes, and resistors for controlling the effective resistance of the rotor circuit, wherein the semiconductor circuits obtain changes in resistance in different ways and over different ranges of resistance.

A further object is to provide a wound rotor induction motor having an improved semiconductor speed control circuit connected to the rotor windings, and to employ the same concept in controlling a cascade type polyphase induction motor wherein the speed control is in circuit with one stator winding for changing its effective resistance.

In accordance with the invention, a new and improved speed control circuit is provided for a polyphase induction motor having inductively coupled stator and rotor windings wherein the speed control circuit is coupled to either the rotor or stator windings for varying the effective resistance of that motor winding cricuit to thereby control the speed of the motor. The improved speed control circuit comprises a polyphase circuit which has a number of phases equal to the motor winding phases and which comprises a plurality of circuits each including at least the series combination of a thyristor and resistor. Phase controlled gating means are provided for rendering conductive each said thyristor at selected intervals for varying the current flowing in the stator or rotor winding circuit and change the effective resistance of that motor winding circuit.

In the several embodiments of the invention, bidirectional thyristors such as the triac and the diac are selectively controlled to be conductive in one direction or both directions of the alternating current power appearing in the thyristor or stator windings to vary the current flowing through the motor winding with acceptable wave shape without producing excessive harmonics. By phase controlling the thyristors, smooth changes in motor winding resistance over a wider range can be produced, and additional step changes in resistance are obtained by employing additional resistors or inductors in combination with diodes or mechanical switches. By employing either unidirectional thyristors such as the silicon controlled rectifier or bidirectional thyristors in phase controlled full wave bridge rectifier configurations, only one set of these resistance changing components need be used. Commutation circuits are added in some embodiments to control the turn-off of the thyristor and control the power factors of the current. The effective resistance of the motor winding circuit is also changed by means of a time ratio control circuit connected across the direct current output terminals of a full wave bridge rectifier. The speed control circuit is ordinarily coupled to the rotor windings to vary the effective rotor resistance but can be coupled as well to one stator winding of a cascade induction motor.

The foregoing and other objects, features, and advantages of the invention will be apparent from the following more particular description of several preferred embodiments of the invention as illustrated in the accompanying drawings wherein.

Figure 1:
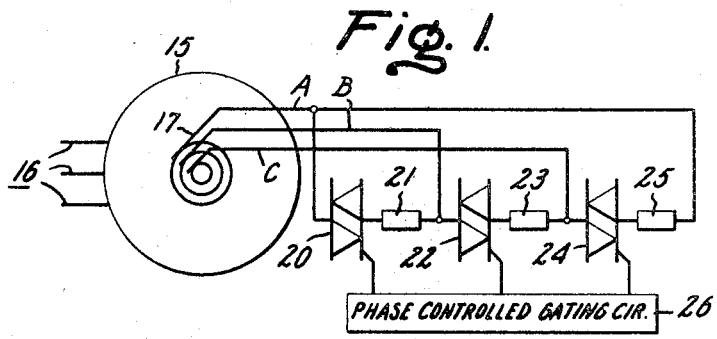
FIG. 1 is an end view of a wound rotor induction motor and further includes a schematic circuit diagram of a delta-connected speed control circuit comprising semiconductors and resistors connected to the slip rings of the motor.
Figure 3:
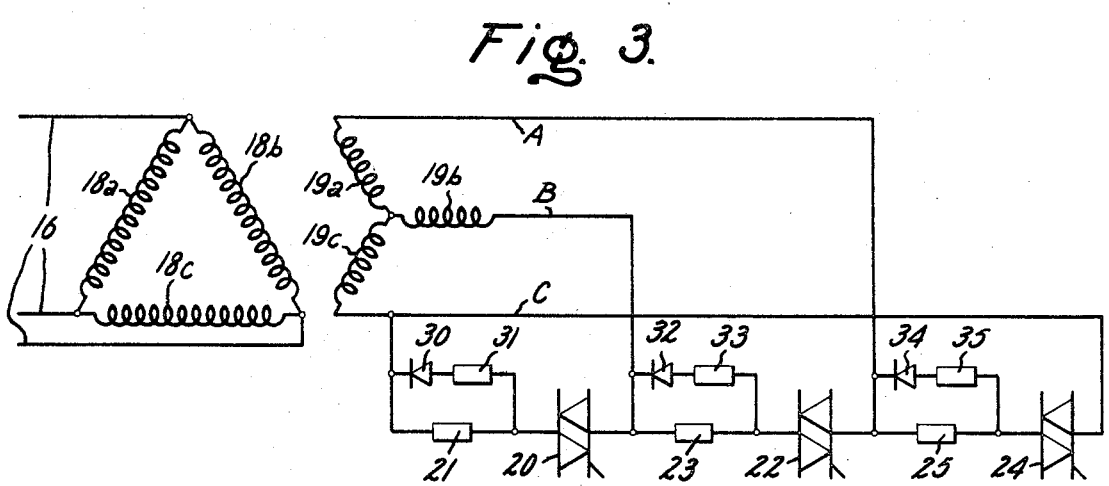
FIG. 3 is a schematic circuit diagram of a modification of the circuit of FIG. 1 which further includes diodes to achieve a wider range of resistance to control the effective rotor resistance.

In FIG. 1 is shown a three-phase wound rotor induction motor 15 having stator windings which are connected through three-phase supply lines 16 to a source of voltage, and rotor windings which are connected as three-phase windings and coupled individually to three slip rings shown here diagrammatically at 17. A speed control circuit is connected across three lines A, B, and C which are in turn respectively connected to the slip rings 17. The electrical connection of the three-phase stator and rotor windings are shown in FIG. 3, wherein the three stator windings 18a, 18b, and 18c are conventionally delta-connected together across the supply lines 16, and the rotor windings 19a, 19b, and 19c are each connected together at a common point and to one of the lines A, B, and C of the speed control circuit. The speed control circuit comprises three interconnected load circuits each including at least one thyristor and resistor in series circuit relationship with each of the three combinations of pairs of rotor windings for varying the effective resistance of the rotor circuit to thereby control the speed of the motor 15. With a high effective rotor resistance the motor runs relatively slowly, and to increase the speed the effective rotor resistance is decreased until the motor has its highest speed when the effective rotor resistance is at its lowest value.

The term "rotor resistance" or "effective rotor resistance" as herein used may include resistors which are mounted outside the rotor and are included in the rotor circuit by appropriate electrical connections. In squirrel cage motors the desired rotor resistance is designed into the rotor. But in wound rotor motors additional resistors are usually mounted outside the rotor and included in the rotor circuit by suitable electrical connections which may include slip rings and switching devices. The "effective rotor resistance" includes these external resistors which are included in the rotor circuit.

The externally mounted speed control circuit in FIG. 1 is delta-connected and comprises a bidirectional conducting triac device 20 connected in series circuit relationship with a resistor 21 across the lines A and B, another triac device 22 and resistor 23 in series across the lines B and C, and a third triac device 24 connected in series with a third resistor 25 across the lines A and C. The triac device is a gate controlled bidirectional conducting thyristor wherein conduction of current through the device when one load terminal is positive with respect to the other, or vice versa, can be initiated by the application of a gating signal to the gating electrode of the device, but thereafter the gating electrode loses control over conduction through the device until the current drops below a minimum holding current by reduction of the applied voltage to zero and the device turns off. As used in this circuit and in a number of circuits to follow, the triac devices of other thyristors to be described are used in a phase controlled mode of operation in which the thyristor is rendered conductive by the application of a gating signal at a selected phase in each half cycle of the alternating current power induced in the rotor winding, and conduction through the thyristor continues until the end of that half cycle when the current through the device drops below the holding current. Thus, the control circuit can be relatively simple since the thyristors are line commutated and no commutation circuits are required. Gating signals for the triacs 20, 22, and 24 are obtained from a phase controlled gating circuit 26 which applies the gating signals to the triacs in sequence but at the same phase retard angle in the three corresponding half cycles of operation of the triac devices in order to avoid undesirable D-C currents in the rotor windings. Suitable phase controlled gating circuits which can be employed are described for instance in the Silicon Controlled Rectifier Manual, 4th Edition, published by the Rectifier Components Department of the General Electric Company, Auburn, N.Y., copyright 1967.

In a simple mode of operation of the control circuit of FIG. 1, two values of effective rotor resistance are obtained by (1) selectively turning on each of the three triacs for conduction of current in either one direction or the other for a complete half cycle, or (2) by rendering the triacs conductive in both directions for passage of current in both half cycles of a complete cycle. With the triacs 20, 22, and 24 turned on for conduction of current through a complete half cycle in only one direction, the effective rotor resistance has a high value because current flows through the resistors 21, 23, and 25 only half the time, or alternatively it can be thought that the control circuit has infinite resistance half the time because the triac devices are non-conducting half the time. With the triacs gated on for conduction of current in both directions throughout a complete cycle, the effective rotor resistance has a low value. This may be visualized more clearly by referring to FIG. 2a where the current waveforms for the three triacs are plotted and the three corresponding positive half cycles are shaded to indicate conduction of current. The second resistance value is obtained when the triacs are also conductive for the negative half cycles. Although there are only two values of effective rotor resistance when the triacs are controlled in this manner, the wave shape and the power factor are both good.

Figure 2A:
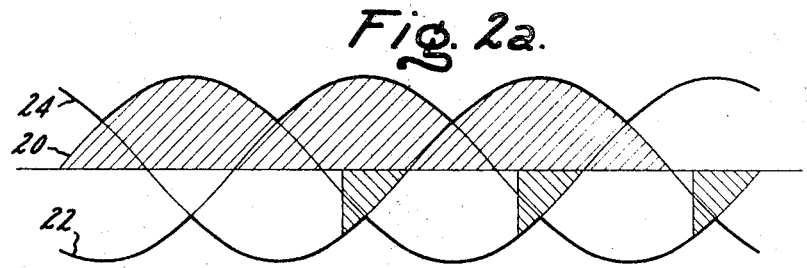
FIGS. 2a and 2b are diagrams of current waveforms with respect to time for three-phase circuits to facilitate explanation of the modes of operation of the circuits here described.

A wide range of effective rotor resistance can be obtained by varying the phase retard of turn-on of the triac devices in each half cycle of operation. The highest obtainable effective rotor resistance with this circuit is obtained by gating on each of the triacs late in either of the positive half cycle or the negative half cycle. In FIG. 2a, the triacs 20, 22, and 24 are each gated on at a phase angle of about 135° of the negative half cycle and the shaded area is indicative of the current passing through each triac device before it is rendered non-conductive. A high effective rotor resistance is produced at the expense of poor wave shape and a lagging power factor. As the phase angle for gating on the triacs is continuously reduced in the negative half cycles, the effective rotor resistance decreases toward a mid-range value and there is a corresponding improvement in the wave shape and power factor. To further lower the effective rotor resistance, each triac device is rendered conductive for the entire negative half cycle and for an increasing portion of the positive half cycle. Thus, a continuous change in effective rotor resistance over a relatively wide range is possible by phase controlling the triac devices.

Although the resistors 21, 23, and 24 may be linear or non-linear, the control range of rotor resistance with acceptable wave shape and power factor is increased when these resistors have a large positive temperature characteristic. Since the power dissipated in the rotor increases with torque and slip, high resistance is desired when the resistor current or power is high. Non-linear resistors which are current sensitive or power sensitive are preferable, and the use of temperature or current sensitive resistors in the FIG. 1 circuit is advantageous to increase the change in resistance because an additional change in resistance obtained in this manner decreases the extent to which the triac devices must be phase controlled in order to obtain the desired effective resistance of the rotor circuit. The circuits to follow include several other ways of obtaining change in effective rotor resistance, and it is preferred that non-linear resistors be used in these circuits also.

The circuit of FIG. 3 uses extra diodes and resistors to obtain a greater control range of rotor resistance with acceptable power factor. In addition to the three triacs 20, 22, and 24 and their associated resistors 21, 23, and 25, this speed control circuit includes the series combination of a diode 30 and a resistor 31 in parallel relationship across the resistor 21; a diode 32 and resistor 33 in parallel with the resistor 23; and a diode 34 and resistor 35 connected in parallel with the resistor 25. With this arrangement there are three ranges of resistance with acceptable wave shape and good power factor when the triacs are rendered conductive for an entire half cycle, as compared to the two ranges of resistance obtained in FIG. 1 when the triacs are conductive first in only one direction and then in both directions. Looking at only the first of the delta-connected load circuit branches, the others being the same, high effective resistance is obtained when the line C is positive with respect to the line B and the triac 20 is rendered conductive only during the half cycle in which the diode 30 is blocking, so that current passes only through the first resistor 21. Medium resistance is obtained when triac 20 is rendered conductive for only the half cycle during which the diode 30 is forward biased, the resistance now being that due to tne parallel combination of the two resistors 21 and 31. The low resistance value is obtained when the triac 20 is turned on for both of the positive and negative half cycles whereby the resistance of the circuit in one half cycle is resistor 21 and in the other half cycle is the parallel combination of the resistors 21 and 31. The resistors 21, 23, and 25 may have relatively high resistance values to produce the desired high resistance effect.

As was the case with the speed control circuit of FIG. 1, the FIG. 3 circuit can have a greater control range beyond these three resistance values by phase controlling the triacs 20, 22, and 24 to be conductive for a desired portion of the half cycle in one or both directions. The higher resistance values are obtained by gating on the triacs late in the half cycle in which the diodes 30, 32, and 34 are blocking and current passes through only the resistors 21, 23, and 25. The highest resistance values are obtained of course at the expense of poor wave shape and lagging power factor. The effective rotor resistance can be decreased continuously as the triacs conduct current for an increasing portion of this half cycle. Then the triacs can be gated on only during the half cycle in which the diodes 30, 32, and 34 are forward biased, and the effective rotor resistance is decreased continuously as the phase retard angle for gating them on is decreased. Finally, the triacs can be rendered conductive for the entire half cycle in which the resistors 21, 23, and 25 are in the circuit, and then phase controlled to gradually and continuously decrease the effective rotor resistance during the other half cycle in which all six resistors are in the circuit. A still lower control range can be had by gating on the triacs for the entire half cycle in which all six resistors are in the circuit, and then phase controlling the triacs during the other half cycle in which only the resistors 21, 23, and 25 pass current. It is thereby seen that by phase controlling the triacs 20, 22, and 24, a large range of effective rotor resistances can be obtained. For less expensive control with good wave shape and power factor, three resistance values can be produced when the triacs are controlled to be conductive for a complete half cycle in one or both directions.

Figure 4:
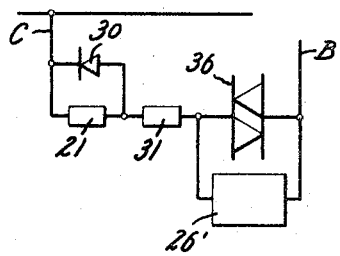
FIGS. 4 and 5 are diagrams of a single phase of the speed control circuit illustrating variations of the FIG. 3 circuit including the addition of inductors.

FIG. 4 is a variation of the FIG. 3 circuit which uses a series connection of resistors for high resistance to dissipate heat more rapidly when the power requirements are apt to be the greatest. In the one circuit branch which is shown, the bidirectional conducting thyristor device 36 is a diac. The diac is similar to the triac in that it conducts current in both directions depending upon the potential across its load terminals, however it differs from the triac in that it does not have a gate electrode and instead is gated on for conduction of current by a gating circuit connected across the load terminals of the device. The gating circuit 26' is not shown in detail in this figure, however any suitable gating circuit such as one of those described in the previously mentioned SCR Manual may be employed. Reference may also be made to U.S. Pat. No. 3,353,032, issued Nov. 4, 1967 to B. D. Bedford and R. E. Morgan entitled "Flyback Power Amplifier," assigned to the same assignee as the present invention. The two resistors 31 and 21 are connected in series circuit relationship with the diac device 36 across the lines C and B, and the diode 30 is connected across the resistor 21. Under high resistance conditions with the diode 30 blocking, both of the resistors are used to dissipate heat. Like FIG. 3, this circuit arrangement has three resistance values when the diac 36 is controlled to be conductive for a complete half cycle in one or both directions.

Figure 5:
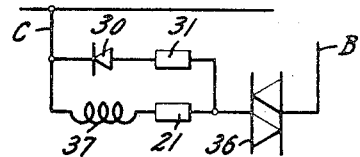

FIG. 5 is another variation of the FIG. 3 circuit (only one circuit branch is shown here) in which the diac device 36 is substituted for the triac 20. There is also a small inductor 37 in series with the resistor 21 and the diac device 36 to increase the apparent resistance when the diac 36 is controlled for high resistance by being rendered conductive only during the half cycle in which the diode 30 is blocking. This increases the control range with acceptable wave shape and power factor. The addition of reactance to the speed control circuit removes the worst high frequency components of the current wave shape and does not allow high peaks of current when the circuit is controlled to obtain the highest rotor resistance. When the diac 36 is conductive for a complete half cycle, however, the impedance of the inductor 37 is relatively low. Due to the addition of the apparent resistance to the circuit by the inclusion of inductor 37, the resistors 21 and 31 may have somewhat lower values in the circuit of FIG. 5 as compared to the circuit of FIG. 3.

Because of the bidirectional conducting characteristics of the triac device or the diac device or other equivalent bidirectional conducting thyristors, a much better wave shape is obtained in the delta-connected speed control circuits than if a unidirectional conducting thyristor such as the silicon controlled rectifier were used. The silicon controlled rectifier is conductive in only one direction, when the anode is positive with respect to the cathode, and can be phase controlled by the application of a gating signal to its gate electrode. Thus, the silicon controlled rectifier always has a very high impedance during the half cycle when it is reverse biased. Since the triac and diac conduct in both directions, the same effective resistance can be obtained with a better wave shape than if a silicon controlled rectifier were used, or alternatively, a larger resistance range is obtained.

Figure 6:
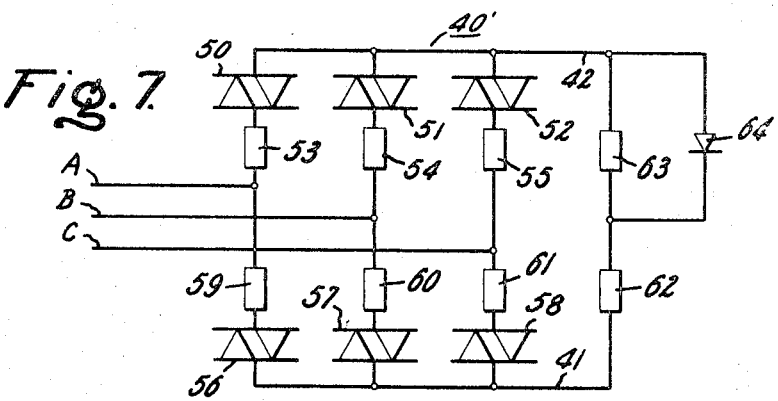
FIG. 6 is a diagram of another embodiment of the invention wherein a phase controlled full wave bridge rectifier is connected to the rotor windings and includes resistors with contactors in the output of the bridge rectifier for varying the effective resistance of the rotor circuit.

FIG. 6 shows a speed control circuit for controlling the effective resistance of the rotor circuit in which silicon controlled rectifiers are used to advantage. This circuit comprises a phase controlled three-phase full wave bridge rectifier whereby only one set of resistors need be used to obtain a large change in effective rotor resistance in all three rotor winding circuits. A conventional phase controlled bridge rectifier 40 comprising three diodes and three SCR's having a phase controlled gating circuit 26" is connected through lines A, B, and C to the rotor windings 19a, 19b, and 19c. The D-C load circuit is connected between the positive output terminal 41 and the negative output terminal 42 of the bridge rectifier 40 and comprises the series combination of three resistors 43, 44, and 45, and also an inductor 46 to increase the apparent resistance of the load circuit. A coasting diode 47 is connected across the D-C load circuit to effect discharge of the inductor 46. To provide for several step ranges of load resistance, mechanical contactors 48 and 49 are respectively connected across the resistors 44 and 45. By initially opening the contactors 48 and 49 and then closing them one at a time, at least three values of effective rotor resistance are obtained with good wave shape and power factor when the SCR's in the bridge rectifier 40 are rendered conductive for a full 120°. By phase controlling the SCR's to be conductive for less than 120° with each load range of the D-C load, a big change in effective rotor resistance can be produced for smooth speed control.

Figure 7:
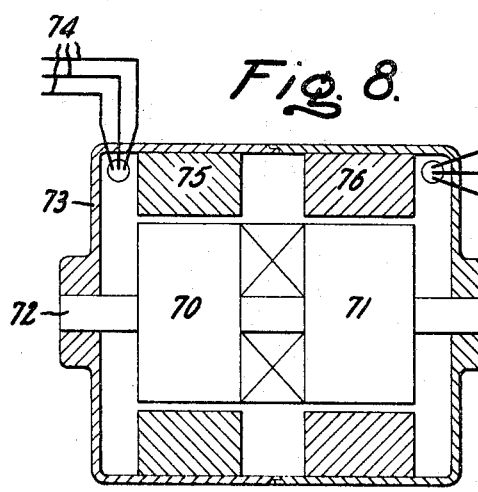
FIG. 7 is a schematic circuit diagram of a speed control circuit similar to that shown in FIG. 6 wherein the phase controlled bridge rectifier comprises diacs and resistors.

In FIG. 7 bidirectional conducting thyristors are used in three-phase full wave bridge rectifier 40' to obtain an even larger change in effective rotor resistance. The bridge rectifier comprises three diac devices 50, 51, and 52 respectively connected in series circuit relationship with resistors 53, 54, and 55 between the output terminal 42 and lines A, B, and C. On the other side of the bridge, diac devices 56, 57, and 58 are respectively connected in series with resistors 59, 60, and 61 between the lines from the rotor windings and the other output terminal 41. The D-C load connected across the terminals 41 and 42 comprises two series connected resistors 62 and 63, and further includes a diode 64 in parallel with the resistor 63. The D-C load is essentially the same arrangement as in FIG. 4. Depending on the manner in which the diac devices in the bridge rectifier 40' are controlled, the active circuit can include resistors 62 and 63, or only the resistors 53, 54, and 55, only the resistors 59, 60, and 61 and parallel combinations of these groups of resistors. In addition, the diac devices on either side of the bridge can be phase controlled to conduct for less than the normal full 120°. Although the control circuit is rather complicated, it is seen that there is considerable versatility in this circuit to obtain a very large change in effective rotor resistance. A limited amount of phase control can be used (i.e., the diacs are controlled to be conductive for nearly a full 120° in either direction) with the different values of resistance to obtain good wave shape at fairly good power factor.

Figure 8:
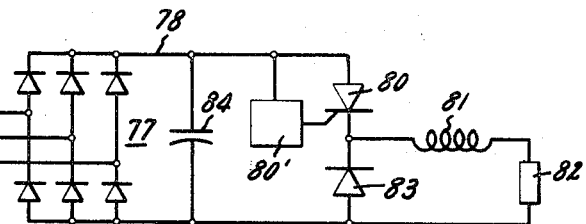
FIG. 8 is a diagrammatic side view of a cascade polyphase induction motor having two interconnected modified squirrel cage rotors, and further includes a schematic diagram of a speed control circuit connected to one of the stator windings which comprises a diode bridge rectifier and time ratio control means for varying the resistance.

As shown in FIG. 8, a time ratio control circuit can also be used to vary the effective "rotor" resistance to obtain speed control of a polyphase induction motor. The induction motor shown in FIG. 8 is a cascade motor arrangement for getting slip frequency power out of the motor. The cascade motor includes two rotors 70 and 71 rotatable about a shaft 72 journalled in the ends of a motor housing 73. Supply lines 74 are connected to the first stator 75 associated with the rotor 70, and the speed control circuit is connected to the second stator 76 associated with the rotor 71. The two rotors 70 and 71 are modified squirrel cage rotors with insulated bars and connections between the rotors. The insulated rotor bars of the two rotors are transported between rotors to reverse the phase rotation. For this type of motor, synchronous speed is based on the total number of poles in both portions of the machine, and with 60 cycle power the maximum speed approach 1800 r.p.m. when there are two poles in each of part of the machine. This type of motor can be hermetically sealed as it is not necessary to use slip rings, and the speed of the motor is controlled by controlling the effective resistance of the second stator winding 76 circuit. This is equivalent to changing the effective rotor resistance. Full speed operation is obtained when the effective resistance of the second stator winding circuit is relatively low.

The speed control circuit for varying the resistance of the motor winding circuit comprises a conventional three-phase full wave diode bridge rectifier 77 comprising six diodes connected in the usual manner. The previously mentioned time ratio control cricuit is connected across the positive and negative direct current output terminals 78 and 79, respectively. The time ratio control circuit comprises the series combination of a silicon controlled rectifier 80, a filter inductor 81, and a load resistor 82 coupled across the bridge rectifier terminals 78 and 79. A coasting diode 83 is connected in parallel with the filter indicator 81 and load resistor 82 to provide a path for discharging the filter inductance during the intervals when the silicon controlled rectifier 80 is non-conductive. A filter capacitor 84 is also connected across the bridge output terminals 78 and 79 to smooth the voltage supply to the time ratio control circuit. Any suitable gating circuit and commutation circuit 80' can be used for turning on the silicon controlled rectifier 80 and turning it off after a desired period of conduction, and since these circuits are well known, they are not here illustrated. To operate with low slip voltage in the second stator 76, a transistor commutating circuit or a separate source of commutating voltage is preferred.

In the operation of the time ratio control circuit in FIG. 8, the silicon controlled rectifier 80 is turned on and off at different rates to vary the ratio of the time for which it is conducting to the time for which it is non-conductive. This changes the voltage applied to the load resistor 82 and results in varying the effective resistance appearing across the D-C output terminals 78 and 79. There may be as much as 100 to 1 change in resistance, and therefore the resistance of the stator winding circuit of the second stator 76 is changed by the same amount to control the speed of the cascade motor. The manner in which a time ratio control circuit operates is well known, and reference may be made for instance to U.S. Pat. No. 3,019,355 issued Jan. 30, 1962 to R. E. Morgan, and assigned to the same assignee as the present invention. The use of the time ratio control circuit for varying the effective resistance for speed control purposes is not limited to the arrangement shown in FIG. 8, but may be applied for varying the effective resistance of the rotor circuit as taught by the other speed control circuits described.

With the single exception of the silicon controlled rectifier 80 in the time ratio control circuit just described, the other thyristors in the speed control circuits employing phase controlled bridge rectifiers and delta-connected loads were phase controlled only for turning them on, and in each case the thyristor was rendered non-conductive when the current through it dropped below the holding value when the potential across the thyristor was reversed. That is to say, there was no control of the turn-off of the thyristor. By adding a commutating circuit to the thyristors, it is possible to phase control both the start and the finish of conduction in the main thyristors for the purposes of voltage control and control of the power factor in either leading or a lagging direction. This type of control has many possible uses where the source of A-C is limited in its ability to handle reactive kva.

Figure 9:
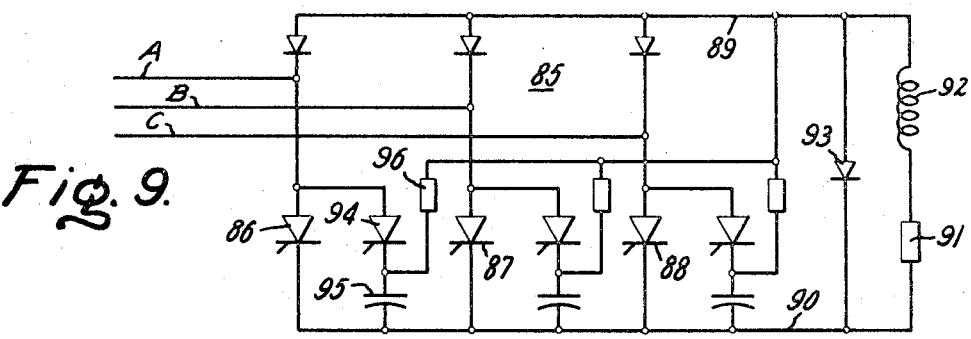
FIG. 9 is a schematic circuit diagram of a speed control circuit wherein the silicon controlled rectifiers in a phase controlled bridge rectifier are provided with commutating circuits to control the power factor.

Referring to FIG. 9, the bridge rectifier 85 is connected to the rotor windings of a polyphase induction motor and includes three diodes and three main SCR's 86, 87, and 88 which respectively provide a negative D-C output terminal 89 and a positive output terminal 90 across which are connected one or more resistors 91 and inductor 92, and also a coasting diode 93. Other load resistors, contractors, or diodes may be provided as described previously. The commutation circuits for the main SCR's 86, 87, and 88 are identical and only that for the SCR 86 will be described. This commutation circuit comprises the series combination of an auxiliary SCR 94 and a commutating capacitor 95 connected across the anode and cathode of the SCR 86. The junction between the auxiliary SCR 94 and the commutating capacitor 95 is connected through a charging resistor 96 to the negative D-C terminal 89. During the time that the main SCR 86 is reverse biased, the commutating capacitor 95 charges to the full value of the D-C voltage across the output terminals 89 and 90. The main SCR 86 is rendered conductive by a suitable gating circuit, not here shown, at a selected phase following the time at which the voltages in the bridge rectifier 85 are such that it is forward biased. When it is desired to turn off the main SCR 86, the auxiliary SCR 94 is gated on to connect the reverse voltage on the commutating capacitor 95 directly across the main SCR 86, thereby commutating it off.

Figure 2B:
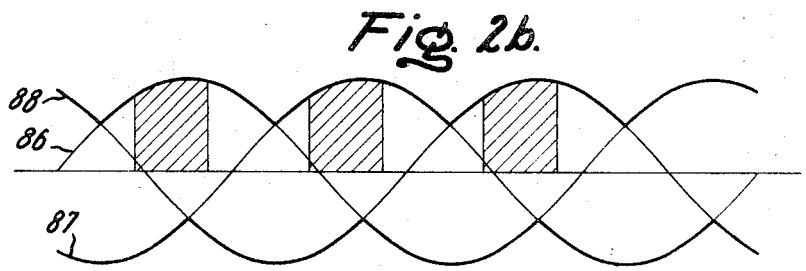

Phase control of both the turn-on and turn-off of the main SCR's 86, 87, and 88 is shown diagrammaticlly in the positive half cycles in FIG. 2b wherein it is seen that the current supplied to the load resistor 91 and inductor 92 has a leading power factor. In the same manner the turn-on and turn-off of the main SCR's can be controlled to supply a lagging power factor. The special commutating shown in FIG. 9 is very reliable in that it is supplied by the A-C circuit. Natural rectifier commutation and A-C impedance limits the fault current and gives the special commutating circuit repeated opportunities to recover from occasional failures. Normal operation is quickly resumed after transient over-loads or disturbances in the A-C power circuit or control circuit cause a momentary failure of the special commutating circuit.

Figure 10:
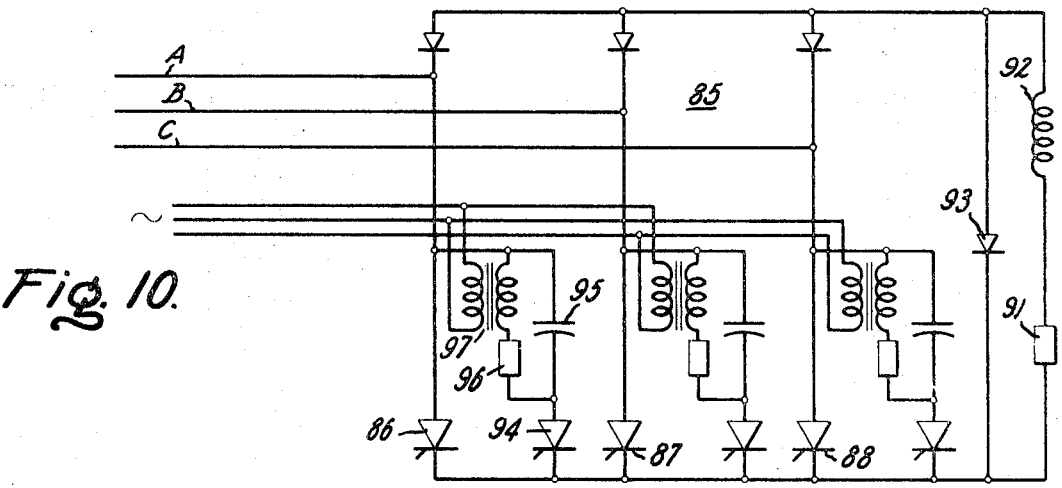
FIG. 10 is a diagram of a circuit similar to FIG. 9 but includes additional provision for voltage control.

FIG. 10 shows a variation of the circuit in FIG. 9 for obtaining additional voltage control as well as power factor control, and corresponding elements are indicated by the same reference numerals. The auxiliary SCR 94 and the commutating capacitor 95 are reversed in position, and the charging resistor 96 is connected in series with the secondary winding of one transformer phase 97 of a separately energized three-phase transformer. The other end of the secondary transformer winding is connected to the opposite plate of the commutating capacitor 95 and to the anode of the main SCR 86. The commutating capacitor 95 is therefore charged through the transformer winding 97, and the transformer 97 also changes the voltage across the main SCR 86 when it is codnucting.

Figure 11:
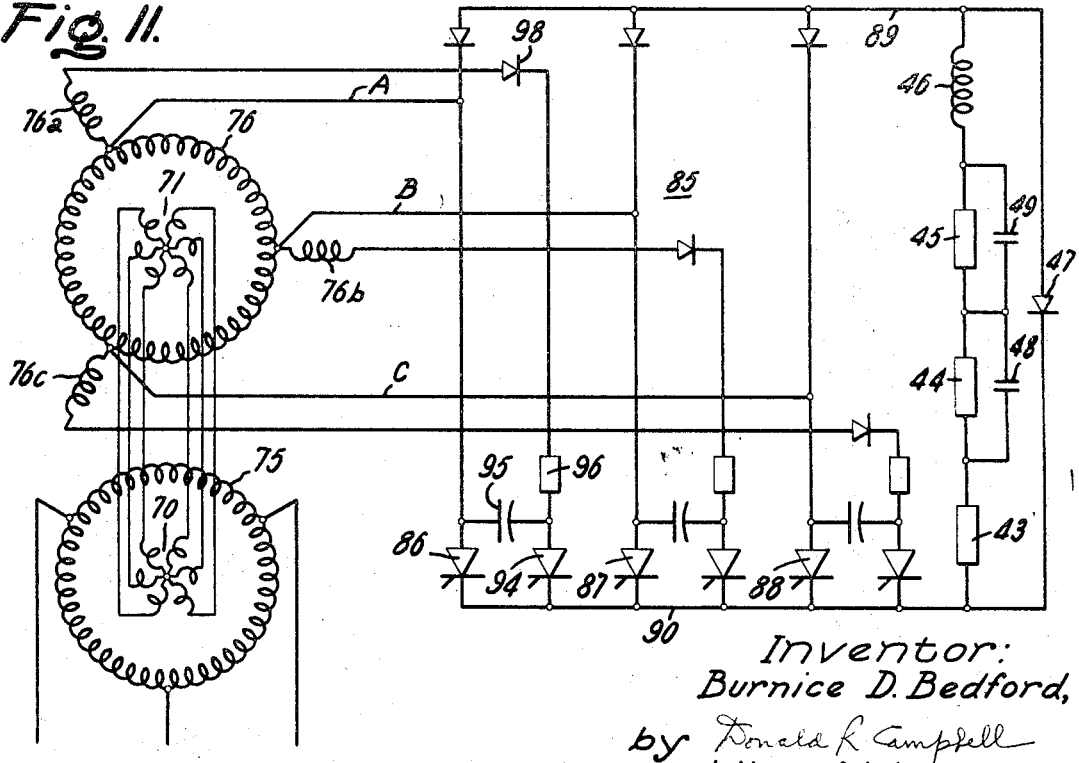
FIG. 11 is a schematic circuit diagram of a cascade induction motor of the type shown in FIG. 8 wherein a special phase controlled bridge rectifier with commutating circuits obtains power factor control and a large change in resistance.

The phase controlled rectifier with leading power factor is a very desirable circuit for controlling the motor speed by varying the effective resistance of the second stator winding circuit in the cascade motor arrangement previously shown in FIG. 8. FIG. 11 shows a polyphase cascade induction motor with a speed control circuit which includes a special rectifier for selecting the phase of both turn-on and turn-off of the silicon controlled rectifiers. The electrical diagram of the cascade motor shows the arrangement of the two interconnected rotor windings 70 and 71, and the two stator windings 75 and 76 the first of which is connected to a three-phase power source while the second is connected to the speed control circuit. The three-phase bridge rectifier 85 is essentially the same as the phase controlled bridge rectifier in FIG. 9, and corresponding elements are identified by the same reference numerals. The load circuit connected across the D-C output terminals 89 and 90 is essentially the same as has been described in FIG. 6 and includes the three series connected resistors 43, 44, and 45 which are in turn in series with the inductor 46. Mechanical contactors 48 and 49 allow step changes in the load resistance circuit. An additional feature of the speed control circuit not previously mentioned is that the commutating capacitors in the commutationg circuits for the main SCR's 86, 87, and 88 are charged by means of extra low current windings 76a, 76b, and 76c on the second stator 76 of the cascade motor. The extra winding 76a is coupled through a blocking diode 98 to the charging resistor 96 associated with the commutating capacitor 95, and the other extra windings are similarly connected. The resistors in the speed control circuit tend to compensate for changes in voltage and frequency to maintain the desired commutating voltage.

In operation, the phase controlled rectifier 85 is controlled to supply current with a leading power factor as explained with regard to FIG. 9. This special rectifier circuit maintains motor torque and smooth speed control over a large speed control range. Smooth speed control can be obtained by initially closing the contactors 48 and 49 and phase controlling the special rectifier 85 in such manner that an increasing amount of current is supplied to the resistor 43, then the contactor 48 is closed, the bridge rectifier is again controlled to supply an increasing amount of current to the two series connected resistors 43 and 44, and so on. The leading power factor rectifier largely supplies the magnetizing current of the second section of the cascade motor including the second stator 76 and the second rotor 71. This leading power factor is maintained at very low voltage and low frequency when the motor is operating with low slip. It will be noted that the circuits of FIGS. 10 and 11 supply commutating voltage when the voltage of the main circuit is small. The ability to operate with good power factor over a wide control range is more important to larger motors, and is especially important to the larger cascade motors shown in FIG. 11.

In summary, a number of different types of speed control circuits for polyphase induction motors each embodying phase controlled semiconductors and resistors have been described. The resistors and semiconductors may be in some cases mounted on the rotor of the motor, or connection to the motor windings may be made by means of slip rings or a cascade motor design. The cascade motor arrangement is more suitable for hermetic motor applications, and in this case the speed control circuit is connected to the second stator windings, while in the more common wound rotor induction motor the speed control circuit is coupled through the slip rings to the rotor windings. Different combinations of resistors, inductors, diodes, and simple contactors can be employed to obtain step changes in resistance, and by phase controlling the semiconductors to be conductive for less than a full 180° or 120° or the like, depending on the circuit involved, a smooth change of resistance over a wider range can be obtained. With the addition of commutating circuits for the thyristors, control of the power factor is also possible. The preferred motor arrangement and control circuit will depend on a number of things, including motor size, speed-torque characteristics, operating schedule, type of cooling, and the relative cost of different types of equipment.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. In a polyphase induction motor having inductively coupled polyphase stator and rotor windings and a speed control circuit coupled to one of the motor windings for varying the effective resistance of that motor winding circuit to thereby control the speed of the motor, the improvement wherein said speed control circuit comprises:
    a polyphase circuit which has a number of phases equal to the phases of the motor windings and which comprises a plurality of circuits each including at least the series combination of a thyristor and a resistor, and
    control means for rendering conductive each said thyristor for predetermined intervals to vary the current flowing in the one motor winding circuit and thereby change the effective resistance of that motor winding circuit,
    wherein each said resistor is a non-linear resistor.

2. In a polyphase induction motor having inductively coupled three-phase stator and rotor windings and a speed control circuit coupled to the rotor windings for varying the effective resistance of the rotor circuit to thereby control the speed of the motor, the improvement wherein the speed control circuit comprises
    a three-phase circuit comprising full wave phase controlled bridge rectifier means including at least three similarly poled diodes and three similarly poled silicon controlled rectifiers connected to provide respectively a pair of direct current output terminals,
    at least one resistor connected in series circuit relationship across the direct current output terminals of said full wave bridge rectifier means, and
    phase controlled gating means for rendering conductive said silicon controlled rectifiers in sequence at selected phases of the alternating current power appearing in said rotor winding during the intervals when the silicon controlled rectifiers are forward biased, to thereby vary the current flowing in the rotor circuit and change the effective resistance of the rotor circuit.

3. A construction as defined in claim 2 further including at least one additional resistor and an inductor connected in series circuit relationship with said aforementioned resistor across said bridge rectifier direct current output terminals,
    a mechanical contactor connected in parallel with one of said resistors for changing the resistance, and
    a coasting diode coupled across said direct current output terminals.

4. A construction as defined in claim 2 further including commutation circuit means coupled across each of said silicon controlled rectifiers for turning off said silicon controlled rectifiers in sequence at selected phases of the alternating current power appearing in said rotor windings, to thereby provide power factor control of the current.

5. A construction as defined in claim 2 further including commutation circuit means coupled across each of said silicon controlled rectifiers for turning off said silicon controlled rectifier in sequence at selected phases of the alternating current power appearing in said rotor windings, to thereby provide power factor control of the current, wherein
    each of said commutating circuit means comprises the series combination of a commutating capacitor and an auxiliary silicon controlled rectifier, and a charging resistor connected between one of said direct current output terminals and the junction of said commutating capacitor and auxiliary silicon controlled rectifier.

6. In a cascade polyphase induction motor having a pair of three-phase stator windings and a pair of polyphase rotor windings which are intercoupled with one another and respectively inductively coupled to the stator windings, and a speed control circuit coupled to one of the stator windings for varying the effective resistance of that stator winding circuit to thereby control the speed of the motor, the improvement wherein the speed control circuit comprises
    a three-phase circuit which comprises a plurality of circuits each including at least the series combination of a thyristor and a resistor, and
    control means for rendering conductive each said thyristor for predetermined intervals to vary the current flowing in the aforementioned stator winding circuit with good wave shape and power factor, and thereby change the effective resistance of that stator winding circuit,
    wherein said three-phase circuit comprises a full wave diode bridge rectifier having a pair of direct current output terminals, and
    a time ratio control circuit connected across said direct current output terminals which comprises said series combination of a thrystor and a resistor, and wherein said control means includes
    commutation circuit means for turning off said thyristor after desired intervals of conduction.

7. In a polyphase induction motor having inductively coupled three phase stator and rotor windings and a speed control circuit coupled to the rotor windings for varying the effective resistance of the rotor winding circuit to thereby control the speed of the motor, the improvement in the speed control circuit which comprises
    a three phase delta-connected circuit wherein each phase comprises the series combination of a triac thyristor and a resistor, and
    gating means for rendering conductive said triacs in sequence for conduction of complete half cycles of the alternating current power appearing in the rotor winding circuit for flow of current through each triac selectively in one direction, to obtain one speed selection, and in both directions, to obtain a second speed selection,
    whereby there are two values of effective resistance of the rotor winding circuit to provide a two speed motor.

8. In a polyphase induction motor having inductively coupled three phase stator and rotor windings and a speed control circuit coupled to the rotor windings for varying the effective resistance of the rotor winding circuit to thereby control the speed of the motor, the improvement in the speed control circuit which comprises
    a three phase delta-connected circuit wherein each phase comprises a triac thyristor connected in series with a first resistor, and the series combination of a diode and a second resistor connected across said first resistor, and
    gating means for rendering conductive said triacs in sequence for conduction of complete half cycles of the alternating current power appearing in the rotor winding circuit for flow of current through each triac selectively in one direction, in the opposite direction, and in both directions, whereby there are three values of effective resistance of the rotor winding circuit to provide a three speed motor.

References Cited

UNITED STATES PATENTS

| | | | |
|---|---|---|---|
| 2,501,361 | 3/1950 | Taylor | 318—237 |
| 3,136,937 | 6/1964 | Miljanic | 318—197 |
| 3,210,579 | 10/1965 | Sonoda et al. | 318—49 XR |
| 3,227,937 | 1/1966 | Koppelmann et al. | 318—237 |
| 3,327,189 | 6/1967 | Hedstrom | 318—237 XR |
| 3,348,110 | 10/1967 | Koppelmann | 318—227 |
| 3,375,433 | 3/1968 | Haggerty et al. | 318—237 XR |

ORIS L. RADER, Primary Examiner

G. RUBINSON, Assistant Examiner

U.S. Cl. X.R.

318—239